3,594,437
PURIFICATION OF DIETHYNYLBENZENES
Dwain M. White, Schenectady, N.Y., assignor to
General Electric Company
No Drawing. Filed Nov. 28, 1969, Ser. No. 880,923
Int. Cl. C07c 15/02
U.S. Cl. 260—674R                           5 Claims

ABSTRACT OF THE DISCLOSURE

Impure diethynylbenzenes are purified by cooling a solution of the material in a liquid alkane, maintaining the temperature of the solution at least as low as $-50°$ C., until the purified diethynylbenzene precipitates from the solution and isolating the precipitate from the solution.

PURIFICATION OF DIETHYNYLBENZENES

This invention relates to a process for purifying diethynylbenzenes. More particularly this invention relates to a process of purifying m- or p-diethynylbenzene and mixtures thereof. In this process, a solution containing not more than 15 percent (based on g. of solute per 100 ml. of solution, assuming 1 g. of solute has volume of 1 ml., hereinafter designated as percent w./v.) of the impure diethynylbenzene in at least one alkane which is liquid under the conditions of temperature and pressure at which the precipitation and isolation steps are performed. The solution is cooled and maintained at a temperature of at least as low as $-50°$ C. until the purified diethynylbenzene precipitates from the solution. Generally, higher yields are obtained by increasing the time at this low temperature to greater than two hours. Thereafter the precipitate is isolated from the solution.

Diethynylbenzenes are members of a broad class of diethynyl compounds used as starting materials for preparing polymeric acetylenes as disclosed and claimed in U.S. Pat. 3,300,456—Hay. The diethynylbenzenes are particularly important because they can be used to make soluble polymers which are greater than 90% carbon. This Hay patent is hereby incorporated by reference. The general procedure for the preparation of diethynylbenzenes is the bromination of the corresponding divinylbenzenes which are then dehydrobrominated to the desired diethynylbenzenes. Due to side reactions, by-products are formed which are difficult to remove from the desired diethynylbenzene. In general, these impurities have one ethynyl group rather than the desired two ethynyl groups and herefore are deleterious in the polymerization process since they act as chain-stoppers, seriously reducing the molecular weight of the polymer which can be obtained from the diethynylbenzene.

The general techniques, such as, fractional distillation or recrystallization are not sufficiently effective to produce the desired purity of the diethynylbenzene. For example, the bromination-dehydrobromination reaction produces under the best procedures for purification, including purification of the brominated intermediate, a final product which contains 95 to 98% of the desired diethynylbenzene with the impurities being chiefly ethynylvinylbenzenes and ethynyl-ethylbenzenes. These impurities are still present in sufficient quantity, even in the 98% pure material, to limit the average degree of polymerization to about 90, i.e., the average number of repeating units in the polymer molecule is 90.

I have unexpectedly discovered that m- and p-diethynylbenzenes and mixtures thereof can be separated sufficiently from these undesirable by-products by a process, the mechanism of which is not completely understood, that the polymers produced therefrom have an average degree of polymerization of greater than 500. The effectiveness of my method apparently is related to the presence of two ethynyl groups in the molecules since when a mixture of m- and p-diethynylbenzene is purified, the ratio of these two materials in the purified mixture changes only slightly from that in the starting material yet the impurities with one ethynyl group are markedly reduced. The process comprises dissolving the impure m- and p-diethynylbenzene or a mixture of these two isomers in at least one alkane which is a liquid under the temperature and pressure conditions used in the precipitation and isolation steps of the process and thereafter cooling the solution to at least $-50°$ C. On standing at this temperature and below, the diethynylbenzenes will precipitate in a purified form.

The particular alkanes or mixture of alkanes used as a solvent are not critical. The can be straight or branched chain or cyclic alkanes. However, they should be a liquid and have at least a low enough melting or freezing point that the solution does not freeze and become essentially a solid mass at the temperature to which the solution is cooled in the process and the boiling point should be high enough that the solvent remains liquid under the temperature and pressure conditions used in the process. Since it will be desirable to readily separate the entrained solvent from the precipitated purified diethynylbenzene, those solvents having relatively low boiling points compared to the diethynylbenzenes are generally preferred.

Of all of the solvents in which the diethynylbenzenes are soluble, it was indeed surprising to find that only the alkanes could be used for my process. These may be the pure alkanes or mixtures of various alkanes, many of which are readily available commercially, for example, as petroleum ethers or ligroins having various boiling point ranges. The alkanes having four or less carbon atoms are gases at ambient room temperature and pressure conditions and therefore must be used either in mixtures with higher boiling alkanes or the process must be carried out under temperature and pressure conditions where they are liquid. Generally, there is no advantage in the carrying out of my process under superatmospheric conditions unless one desires to use a liquefied gaseous alkane as the solvent in order to permit residual solvent to be removed from the precipitated diethynylbenzene by quick release of pressure. Alkanes having greater than 10 carbon atoms and certain of the cycloalkanes having less than 10 carbon atoms have melting points above $-50°$ C. can not be used alone but can be components or a mixture of lower melting alkanes.

Typical of solvents for diethynylbenzenes which I can not use are chlorohydrocarbons, ethers, alcohols, ketones and esters of the lower aliphatic series. Solutions of diethynylbenzenes in these solvents do not form a precipitate when cooled to $-80°$ C. or to the melting point of the solvent if it is higher. The members of the aromatic series as well as the arenes, do not meet the low melting point requirement for the solvent.

It is necessary to cool the solution to at least $-50°$ C., since at temperatures above this, the time for precipitation of the diethynylbenzenes from the solvent becomes increasingly longer that higher the temperature. For example, at $-15°$ C., a solution containing 50% of the diethynylbenzenes formed a precipitate only after many weeks of storage at that temperature.

The effect of concentration is not yet well understood. It appears that there may be several impurities which are present in the diethynylbenzenes in such low concentrations that they can not be readily identified, but their presence is most readily detectable by the effect on solubility of the polymers and copolymers prepared from the purified diethynylbenzenes. If the concentration of the diethynylbenzenes in the solvent is too great, the polymers and copolymers prepared from the purified diethynylbenzenes will not be as readily soluble as the corresponding polymers and copolymers prepared from the same material purified from a less concentrated solution, despite the fact that the best analytical techniques indicate that the purity of the diethynylbenzenes obtained from the two solutions is the same and the subtle difference in the composition of the impurities can not be resolved. The optimum concentration is about 10% w./v. Increasing the concentration of 15% w./v., increases the yield of purified product and within the limit of experimental error, the purity of the products from the 10 and 15% solutions will be the same. However, when the product obtained from the 15% solutions is converted to polymers and copolymers, they are not as readily soluble as the same polymeric products prepared from the diethynylbenzenes purified from the 10% solution. This effect becomes even more pronounced if a 50% w./v. solution is used. Decreasing the concentration of the diethynylbenzene below 10% w./v. does not produce any purer product nor does the purified product produce polymers or copolymers which are any more soluble. Therefore, an approximately 10% w./v. solution is the optimum concentration. Lower concentration can be used, if desired, for example 5 or even 1% w./v. solutions, but with the obvious disadvantage of using a larger volume of solvent, lower yields per cooling cycle, etc.

Within the above-discussed parameters, the degree of purification (>99.0%) obtained in one such precipitation is almost independent of the concentration of impurities initially present, at least if the concentration of the diethynylbenzene is 80% or greater in the material to be purified. However, the yield of purified material is dependent on the initial purity, the temperature used for precipitation and the time the solution is maintained at the temperature to which the solution is cooled. Generally no difference in yield is noticed if the initial purity is ca. 93% or higher. As the 90% level yields decrease ca. 10% and at 80–85%, the yield decreases another 20%. Yields can be increased by evaporation of some of the solvent from the filtrate, followed by a second cooling cycle or the filtrate, without evaporation may be used as the solvent for the next purification run.

The effect of temperature and time at a given temperature is illustrated by the following yields which are typical of the yields obtained from a 10% w./v. solution of a 95% pure diethynylbenzene solution. After 2 hours, no precipitate will have occurred at $-15°$ C. (not even after many weeks), about a 32% yield will be obtained at $-50°$ C. and between 69 and 74% yield will be obtained at $-80°$ C. The effect of time the solution is maintained at $-80°$ C. is illustrated by the fact that the yield of purified diethynylbenzene will be approximately 55% after one hour, 69% after two hours and 82% after 20 hours. Surprisingly enough, even though the yield is increased with increasing time the actual purity of the product is not affected thereby insofar as can be determined by modern analytical techniques and the solubility characteristics of the polymers and copolymers prepared from these purified monomers.

After the purified diethynylbenzenes have precipitated, it is self-evident that a temperature at least is low as that to which the solution was cooled, preferably should be maintained while the precipitate is removed from the mother liquor, and the fresh solvent used to remove entrained mother liquor, likewise, should be so cooled in order to maximize the yield of purified product. Any desired means can be used for separation, for example, filtration, centrifugation, decantation, etc. Higher temperatures than that used for precipitation can be maintained during the separation but with some loss in yield. The maximum temperature which can not be exceeded obviously is that temperature at which the precipitate redissolves before it can be separated.

After the purified product is separated and washed, there usually is some entrained solvent in the precipitate. This is readily removed by flash distillation under vacuum using a cooled receiver. At this point it is obvious that if the solvent, at least that used in the final wash, has a very low boiling point compared to the diethnylbenzenes, flash distillation conditions of temperature and pressure can readily be chosen so that the solvent distills without condensing while essentially all of the diethynylbenzene is condensed and collected in the receiver. I have noted that any color which might be present in the purified product as precipitated is removed during this flash distillation.

Since p-diethynylbenzene in the dry solid state or when molten (M.P. 95° C.), is somewhat unstable, it is best to purify it as a mixture with m-diethynylbenzen. The para isomer is only soluble to the extent of about 10% in the meta isomer at room temperature and its solubility decreases still further as the temperature is decreased down to the melting point of the meta isomer ($-2.5°$ C.). Therefore, the pure p-isomer can be crystallized from the purified mixture of the two isomers. This technique provides a means of obtaining pure p-diethynylbenzene and also m-diethynylbenzene having only a very small amount of the para isomer.

In order that those skilled in the art may better understand my invention, the following examples are given by way of illustration and not by way of limitation. In all of the examples, parts are by weight unless stated otherwise and percentages are by weight except for the percentage composition of the solutions which have previously been discussed. The analyses of both starting materials and isolated materials were combined results of gas chromotagraphy, n.M.r., infrared and mass spectrometry.

EXAMPLE 1

In this example, a diethynylbenzene was used which contained 95% m-diethynylbenzene, 1% p-diethynylbenene 2% 3-ethyl-1-ethynylbenzene, 2% 3-ethynylstyrene. 0.2% vinylstyrene and 0.1% 3-ethylstyrene. A 10% w./v. solution containing 300 g. of the above diethynylbenzene in 2700 ml. of n-pentane was cooled to $-80°$ C. with a solid carbon dioxide bath and permitted to stay at this temperature overnight (approximately 20 hours). The density of m-diethynylbenzene is 0.9669 so that there is no significant error in designating such a solution as 10% w./v. The precipitated diethynylbenzene was separated from the mother liquor by filtration through a funnel precooled and packed in solid carbon dioxide. The precipitate was washed with similarly cooled n-pentane and the crystals pressed to remove most of the entrained solvent. The precipitate was allowed to melt and the melt flash distilled at 44° C. at 0.5 mm. Hg. There was obtained 246 g. of distillate which was a clear colorless liquid. This analyzed 99.8% diethynylbenzenes of which approximately 0.3% was p-diethynylbenzene with the balance being m-diethynylbenzene. The only detectable impurities were 0.04% 3-ethyl-1-ethynylbenzene and 0.16% 3-ethynylstyrene.

To illustrate the effect of the impurities, polymers were prepared from 4.75 g. of both the impure and purified diethynylbenzenes. To aid in obtaining the highest molecular weight due to a solubilizing effect on the copolymers so produced, 0.25 g. of pure p-diethynylbenzene was added to both monomers. They were polymerized in separate solutions containing 0.75 g. of cuprous chloride, 1.5 ml. of tetramethylethylenediamine, 8 ml. of pyridine in 58 ml. of o-dichlorobenzene. The catalyst was preoxidized by bubbling oxygen through the solution and heating to 90° C. When each of the diethynylbenzenes were added, exothermic reactions occurred. After 20 minutes, the reaction mixtures were cooled and added to separate portions of 500 ml. of methanol containing 20 ml. of concentrated aqueous hydrochloric acid to precipitate the polymer. The polymer from the purified diethynylbenzene had an intrinsic viscosity of 1.62 dl./g. whereas the impure material produced a polymer having an intrinsic viscosity of only 0.52 dl./g. both measured in o-dichlorobenzene at 120° C. These intrinsic viscosities correspond to an average degree of polymerization of approximately 575 and 85 respectively, showing the very marked effect of only minor amounts of impurities.

The above yield of 246 g. of purified diethynylbenzene represents an 82% overall recovery based on the total weight of the impure starting material or an 86% yield based on the amount (96%) of diethynylbenzene present in the impure material. When this example was repeated, but the solution was cooled only 2 hours at —80° C., the overall yield decreased from 82% to 69%. Table I lists the above results along with the results obtained with other impure diethynylbenzenes containing not only different ratios of m-diethynylbenzene to p-diethynylbenzene but also of different initial total concentrations of the diethynylbenzenes.

TABLE I

| Initial wt. percent diethynylbenzene | | | Conc. in pentane | Hours at —80° C. | Overall wt. yield of DEB | Purity |
| --- | --- | --- | --- | --- | --- | --- |
| m-DEB | p-DEB | Total | | | | |
| 95 | 1 | 96 | 10 | 2 | 69 | 99.8 |
| 95 | 1 | 96 | 10 | 20 | 82 | 99.8 |
| 95 | 1 | 96 | 15 | 2 | 79 | 99.8 |
| 93 | 0.3 | 93.3 | 10 | 2 | 74 | 99.8 |
| 80 | 11 | 91 | 10 | 20 | 71 | 99.8 |
| 84 | 4 | 88 | 10 | 2 | 43 | 99.4 |

EXAMPLE 2

When the diethynylbenzene to be purified is a mixture of the meta and para isomers, only a very slight change in the ratio of the two isomers occurs during the purification. This is illustrated by the data shown in Table II. These results were obtained using a 10% w./v. solution of the diethynylbenzenes in n-pentane. The general procedure of Example 1 was followed. The data for the last three entries in Table II are not meant to imply that the purified diethynylbenzene was 100% pure. The same concentration of impurities was present in the purified products of the last three entries as was present in the purified product for the first two entries. However, the accuracy of determining the ratio of the two isomers is not sufficient to warrant listing the percentages any more accurately than the listed values.

TABLE II

| Wt. percent diethynylbenzene | | | | Hrs. at —80° C. |
| --- | --- | --- | --- | --- |
| Initial | | Purified | | |
| m-DEB | p-DEB | m-DEB | p-DEB | |
| 96 | 1 | 99.3 | 0.5 | 2 |
| 90 | 5 | 94.6 | 5.2 | 1 |
| 85 | 10 | 88 | 12 | 2 |
| 71 | 25 | 71 | 29 | 1.5 |
| 70 | 26 | 71 | 29 | 2 |

It is significant that there is such slight changes in the ratios of the two isomers. If my purification process was merely a recrystallization, one would expect a decided change, especially in view of the relatively low solubility, previously discussed, of the para isomer in the meta isomer. At room temperature, crystals of p-diethynylbenzene separated from the product of the last three entries in the table.

EXAMPLE 3

This example illustrates the use of the mother liquor to increase the yield with little effect on the actual purity of the recovered material. A solution of 5 g. of 98% pure m-diethynylbenzene was prepared in 45 g. of n-pentane. The solution was cooled to —80° C. in a solid carbon dioxide cooled bath and maintained at that temperature for 2 hours. After filtration and washing as described in Example 1, a 75% overall yield of m-diethynylbenzene having a purity of 99.8% was obtained. The mother liquor from this purification was used to dissolve an additional 5 g. of 98% m-diethynylbenzene. After maintaining this solution at —80° C. for 2 hours, there was obtained 4.7 g. (94% yield, based on the 5 g. dissolved) of purified m-diethynylbenzene having a purity of 99.6%.

EXAMPLE 4

This example illustrates the application of my purification process to a very crude, impure diethynylbenzene mixture which normally would be distilled prior to any further steps of purification. During such a distillation step, considerable loss would occur due to polymerization and tar formation reactions. The material had a very dark brown color and analyzed 84.3% m-diethynylbenzene and 4.4% p-diethynylbenzene. In addition to other impurities, there was 0.3% 3-ethyl-1-ethynylbenzene and 1.8% 3-vinyl-1-ethynylbenzene. A 10% w./v. solution in n-pentane was intensely hazy due to some insoluble material. This was removed by filtration. The filtered solution was cooled to —80° C. and maintained for 20 hours. A yield of 43% based on the total weight of impure diethynylbenzene was obtained by the method described in Example 1, which analyzed 99.4% diethynylbenzene. This example illustrates that my process can even be used to eliminate a distillation step if so desired.

The above examples have illustrated many of the modifications and variations which are possible in my process. Other modifications will be readily apparent to those skilled in the art and can be made without departing from the spirit or scope of the invention. For example, in place of the pure n-pentane, other liquid alkanes or mixtures especially the petroleum ethers can be used. For example, I have used cyclopentane, n-hexane, n-heptane, isooctane and petroleum ether (B.P. 30–60° C.) with results similar to those obtained with n-pentane. Other means for separating the precipitated purified diethynylbenzene can be used in place of filtration, for example, centrifugation, decantation, etc. Other times and temperature of cooling can be used. The purified diethynylbenzenes in addition to being used in making polymers as disclosed in the above-identified Hay patent can likewise be used in the making of the photosensitive polymers as disclosed and claimed in Hay patent application, Ser. No. 764,287, filed Oct. 1, 1968 and assigned to the same assignee as this invention. This application is hereby incorporated by reference as a further disclosure of utility for the purified diethynylbenzenes. These and other variations are fully within the intended scope of the invention as set forth in the following claims.

What I claim as new and desire to secure by Letters Patent in the United States is:

1. The process of purifying diethynylbenzene selected from the group consisting of m-diethynylbenzene, p-diethynylbenzene and mixtures thereof which comprises cooling a solution containing not more than 15% w./v. of the impure diethynylbenzene in at least one of the alkanes which is liquid under the conditions of temperature and pressure used in the precipitation and isolation steps of the process, maintaining the temperature of the solution at least as low as —50° C., until the purified diethynylbenzene precipitates from the balance of the solution and isolating the precipitate from the mother liquor.

2. The process of claim 1 wherein the diethynylbenzene is m-diethynylbenzene containing from 0 to 10 weight percent p-diethynylbenzene.

3. The process of claim 1 wherein the diethynylbenzene to be purified is a mixture of m-diethynylbenzene and p-diethynylbenzene and after the purified mixture of these two diethynylbenzenes is isolated, the mixture is cooled to a temperature which causes p-diethynylbenzene to crystallize from the balance of the mixture and thereafter isolating the p-diethynylbenzene from the mother liquor.

4. The process of claim 1 wherein the solvent is petroleum ether.

5. The process of claim 1 wherein the temperature at which the precipitation step is performed is approximately −80° C.

References Cited

UNITED STATES PATENTS

| | | | |
|---|---|---|---|
| 2,657,244 | 10/1953 | Barney et al. | 260—668R |
| 3,204,004 | 8/1965 | Sexton | 260—668R |
| 3,303,229 | 2/1967 | De Rosset | 260—668R |
| 3,427,354 | 2/1969 | Viehe | 260—668R |
| 2,241,770 | 5/1941 | Dreisbach et al. | 260—67XR |
| 2,317,808 | 4/1943 | Saudhaas | 260—674R |

DELBERT E. GANTZ, Primary Examiner

V. O'KEEFE, Assistant Examiner

U.S. Cl. X.R.

260—668R